United States Patent [19]
Siegel et al.

[11] Patent Number: 5,505,529
[45] Date of Patent: Apr. 9, 1996

[54] HYDRAULIC BRAKE SYSTEM WITH PRESSURE-CLOSED, GRAVITY-OPENED CHECK VALVES

[75] Inventors: Heinz Siegel, Stuttgart; Josef Berding, Ludwigsburg, both of Germany

[73] Assignee: Robert Bosch GmbH, Stuttgart, Germany

[21] Appl. No.: 331,785

[22] Filed: Oct. 31, 1994

[30]     Foreign Application Priority Data

Oct. 30, 1993 [DE] Germany .......................... 43 37 133.7

[51] Int. Cl.⁶ ............................... B60T 8/32; B60K 28/16
[52] U.S. Cl. ...................... 303/116.2; 303/84.2; 303/86; 303/901; 188/352
[58] Field of Search ............................ 303/113.1, 113.2, 303/116.1, 116.2, 84.2, 86, 901; 188/352

[56]              References Cited

U.S. PATENT DOCUMENTS

| | | | |
|---|---|---|---|
| 5,116,109 | 5/1992 | Kuwana et al. | 303/172 |
| 5,131,730 | 7/1992 | Kollers et al. | 303/113.2 |
| 5,324,101 | 6/1994 | Kehl et al. | 303/86 X |

FOREIGN PATENT DOCUMENTS

| | | |
|---|---|---|
| 0482379 | 9/1991 | European Pat. Off. . |
| 4030871 | 4/1992 | Germany . |
| 4039088 | 6/1992 | Germany . |
| 4215706 | 11/1992 | Germany . |
| 2095960 | 4/1990 | Japan . |
| 9116221 | 10/1991 | WIPO . |

*Primary Examiner*—Josie Ballato
*Attorney, Agent, or Firm*—Edwin E. Greigg; Ronald E. Greigg

[57]              ABSTRACT

A hydraulic brake system that has a hydraulic unit for evacuation prior to initial filling, with the primary and secondary circuits dry, the brake system is equipped with special check valves, which are disposed between the primary circuit and the secondary circuit. When the brake system is evacuated, these check valves are in the open position, so that air escapes from the secondary circuits. This makes it unnecessary to open electromagnet valves, which are closed when without current and are present in the brake circuits I and II, electrically. The hydraulic brake system is intended for use in motor vehicles, and its hydraulic unit is designed to carry out anti-lock operation and/or traction controls.

8 Claims, 5 Drawing Sheets

HYDRAULIC BRAKE SYSTEM WITH PRESSURE-CLOSED, GRAVITY-OPENED CHECK VALVES

BACKGROUND OF THE INVENTION

The invention is based on a hydraulic brake system as defined hereinafter. A brake system of this kind is known from International Patent Disclosure WO 91/16221.

In such brake systems, the problem is that the brake system, if its full effectiveness is to be assured, must be vented either before it is filled, or while it is being filled, with hydraulic medium, in other words a fluid such as DOT4. Any air bubbles still present in the hydraulic medium may bring about such an elasticity of fluid columns formed by the medium that the brake pressures required in wheel brake cylinders are not brought about to the requisite level. This is especially true in hydraulic brake systems of the kind that work with a brake booster under high-pressure conditions and/or the kind that are equipped with an anti-lock brake system (ABS) and/or a traction control system (ASR).

Brake systems of this kind have several electromagnet valves that are closed in the state of repose; the valves of return pumps used in these brake systems are normally closed as well.

The problem therefore exists that pockets of air may be present downstream of the magnet valves closed in the position of repose and also downstream of the return pump valves. The air in these pockets may possibly be removed only with difficulty using liquid.

It has also already been proposed that at least the magnet valves closed in the state of repose be triggered electrically upon evacuation prior to filling of the system and thereby opened. To do so, however, special plug connections must be used to supply current to these magnet valves. Special plug connections of this kind are complicated to manufacture and are also expensive and involve operating costs when used.

OBJECT AND SUMMARY OF THE INVENTION

The object of the invention is to overcome these disadvantages. According to the invention, this object is attained by the features set forth herein.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
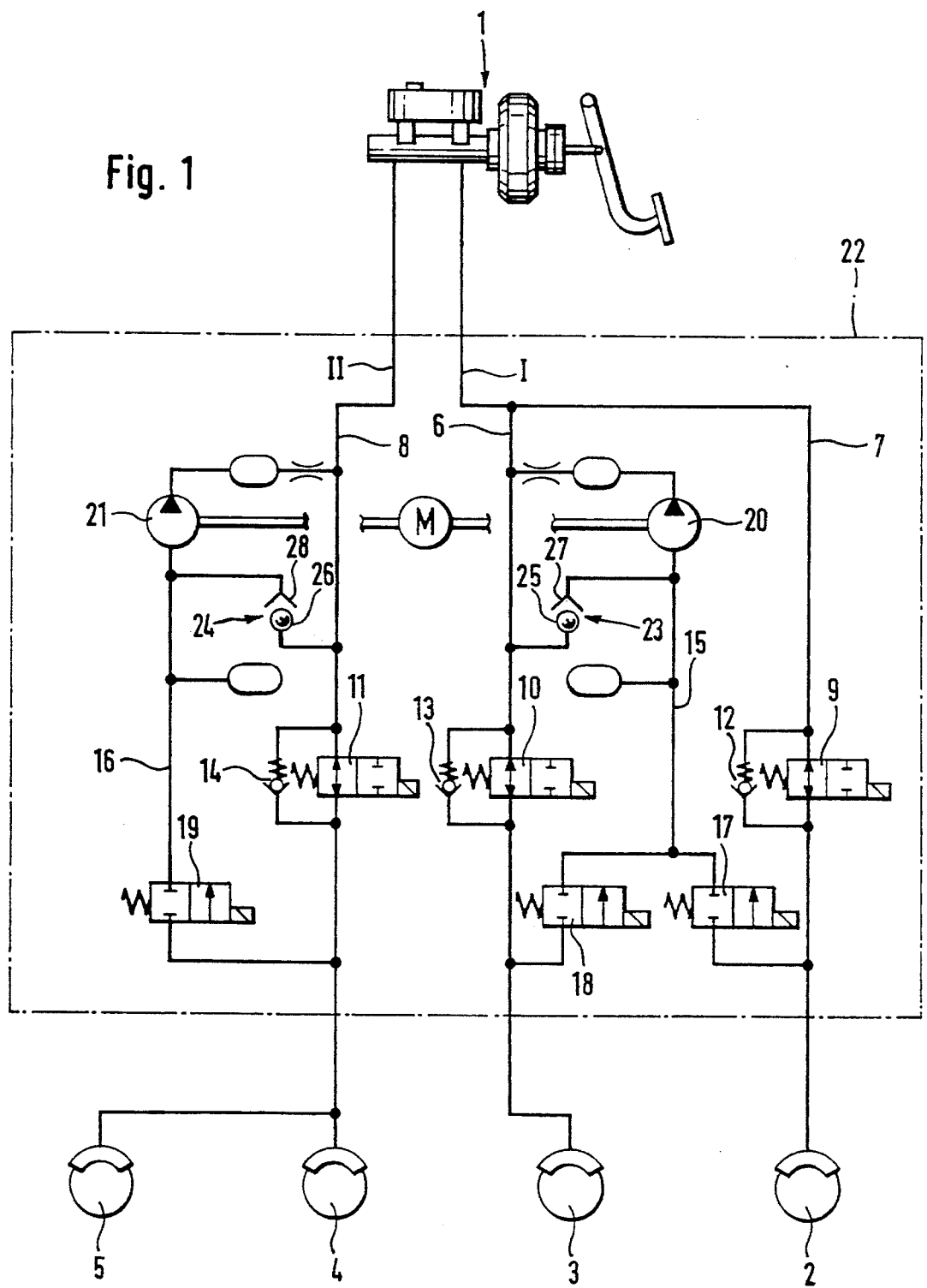
FIG. 1 shows a hydraulic brake system with ABS and with brake circuit distribution by vehicle axle and with one check valve in each brake circuit.

A dual-circuit brake system in accordance with FIG. 1 has a master cylinder 1, which supplies four wheel cylinders 2, 3, 4, 5 with brake fluid for braking, via two brake circuits I and II, one for each axle. Two separate brake lines 6 and 7 lead to the front axle wheel cylinders 2 and 3, while the two rear axle wheel cylinders 4 and 5 are supplied via one common brake line 8.

Pressure buildup electromagnet valves 9, 10, 11 are located in the brake lines 6, 7 and 8, and each can be bypassed via a respective check valve 12, 13, 14 which opens toward the master cylinder 1. One return line 15 and 16, respectively, belongs to each brake circuit I and II and is accessible in the front axle brake circuit I via a respective pressure reduction electromagnet valve 17 and 18 and in the rear axle brake circuit II via a pressure reduction electromagnet valve 19. There is also one return pump 20 and 21 in each return line 15 and 16. The six electromagnet valves 9, 10, 11 and 17, 18, 19 as well as the two return pumps 20 and 21 belong to a hydraulic unit 22 of an ABS device, whose electrical elements are not shown.

The two return lines 15 and 16 and the return pumps 20 and 21 are disposed on the secondary side of the system and therefore readily develop air pockets that cannot be eliminated when the system is filled with brake fluid. According to the invention, both return lines 15 and 16 therefore communicate with the respective brake line 6 and 8 via one special check valve 23 and 24 each. The check valves 23 and 24 are connected at one side to the hydraulic feed lines 6 and 8 between the electromagnet valves 10 and 11 and the master cylinder with the opposite side connected to the return lines 15 and 16 which are input lines to the pumps 20 and 21, respectively. Each check valve 23 and 24 has a ball as its closing body 25 and 26 and a valve seat 27 and 28, respectively, which is not covered before and during filling of the system in the pressureless state of the hydraulic unit 22. From the schematic way chosen to show the valve seat and the closing body, it is apparent that the two check valves 23 and 24 are springless. The valves 23 and 24 are shown in a substantially vertical position with the closing body below the valve seat. Since the closing body is springless, the closing body functions because of a gravity pull on the closing body. That is, the closing body will move away from the valve seat due to gravity and in its repose position will be open for flow of any air bubbles. The closing body will be seated against the valve seat due to pressure from below the closing body and the pressure in line 6 will hold the closing body against the seat when sufficient pressure is in line 6. The valves 23 and 24 are shown as gravity-type valves since no springs or any means are shown which force the closing body to the open position.

Mode of Operation

The hydraulic unit 22 is shipped to the vehicle manufacturer by its vendor dry, both in the primary and the secondary circuits. The primary circuits are those channels through which the fluid flows toward the wheel cylinders 2, 3, 4 and 5 in the normal braking mode. The secondary circuits are those channels and hollow spaces through which there is a flow in the ABS mode and/or the traction control mode. For the initial filling, the brake system equipped with the hydraulic unit 22 is evacuated, and then filling is carried out from the master cylinder 1 or from some other filling point. Since there is communication between the primary circuits and the secondary circuits through the open check valves 23 and 24, the secondary circuits can be reliably evacuated and filled with fluid without having to trigger the electromagnet valves 17, 18, 19 that are closed when without current.

Upon a pressure buildup in the hydraulic unit 22 on the occasion of braking, the check valves 23 and 24 are closed because the flow forces produced entrain the closing bodies 25 and 26 and move them toward their valve seats 27 and 28. This then disconnects the primary and secondary circuits from one another again, and the hydraulic unit 20 is ready for use in the ABS mode.

The advantage of a hydraulic unit of this kind is that - without additional investment on the part of the vehicle manufacturer or the repair facility - it is now possible in a simple way, using typical vacuum filling devices, to fill hydraulic units that are checked when dry and installed in the brake system. This economy also applies to the labor involved (amounting to approximately 10 seconds per vehicle) in attaching or removing electrical line connections between the ABS electrical system (control unit), or the electromagnet valves, and the vacuum filling device.

Another advantage of the invention is that the number of mistakes in vacuum filling, resulting from defective electrical contacting, is reduced to zero.

Figure 2:
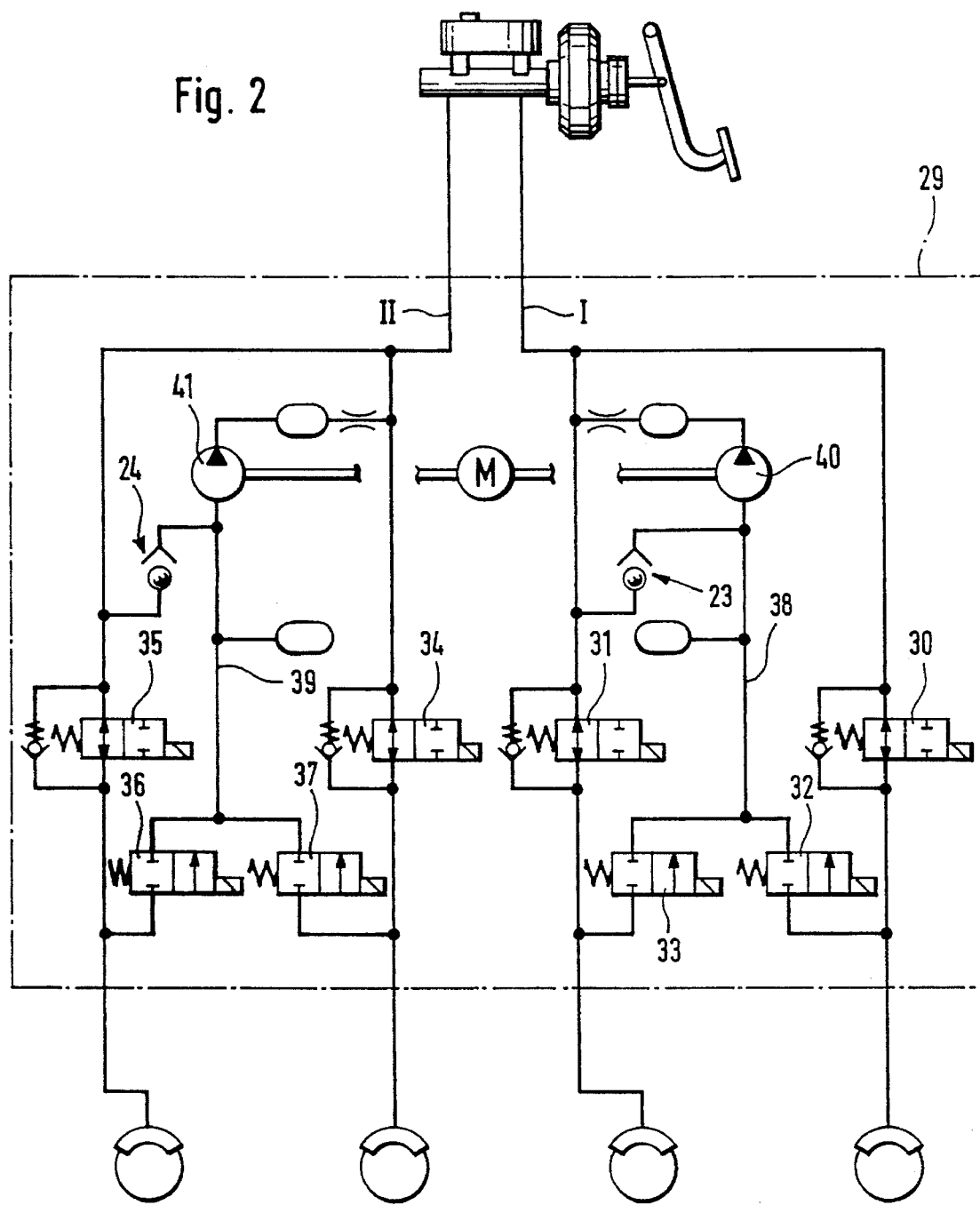
FIG. 2 shows a hydraulic brake system with ABS and with diagonal distribution of two brake circuits and one check valve in each brake circuit.

FIG. 2 shows a similar system to FIG. 1. Here, however, the two brake circuits I and II are distributed diagonally, and in each brake circuit I and II in a hydraulic unit 29, four electromagnet valves each are provided, 30, 31, 32, 33 and 34, 35, 36, 37, respectively, and two in each group are pressure reduction electromagnet valves 32, 33 and 36, 37, respectively, which are closed when without current and lead to the secondary circuit. In this model as well, there is one return line 38 and 39 in each brake circuit I and II, with a return pump 40 and 41, respectively, and each return line 38 and 39 communicates with a brake line 42 and 43, respectively, via a respective check valve 23 and 24, corresponding in design to that of FIG. 1. The mode of operation of the check valves 23 and 24 when the system is vacuum filled is the same as in the embodiment of FIG. 1.

Figure 3:
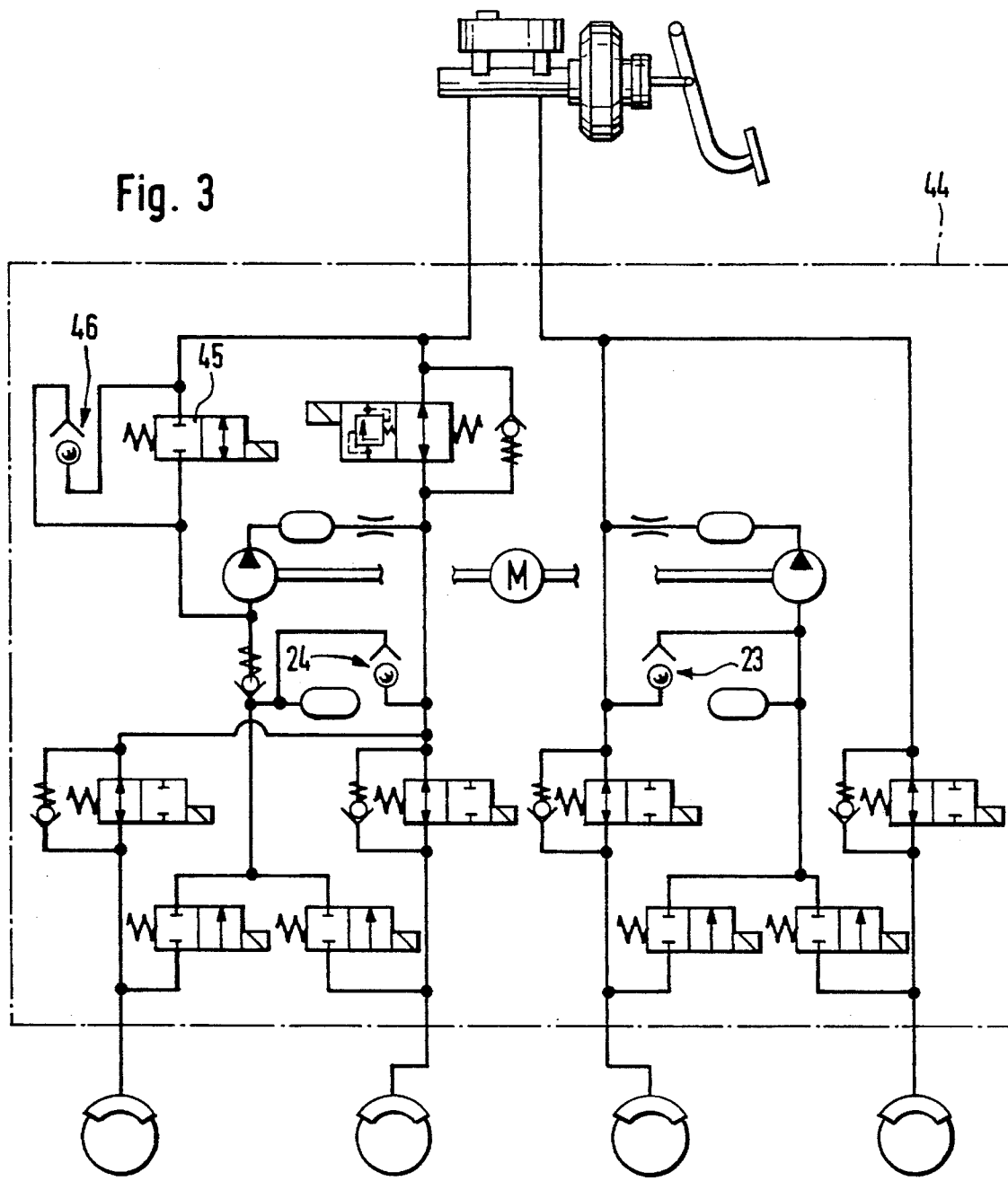
FIG. 3 shows a hydraulic brake system with ABS and traction control devices and with brake circuit distribution associated with the vehicle axles and with three check valves.

The model of FIG. 3, in a hydraulic unit 44, additionally has a traction control device with an electromagnet valve 45 that is closed when without current. By the line closure thus formed, one additional check valve 46 is needed, besides the check valves 23 and 24. The extra check valve 46 is in a line with one end connected on opposite sides of the electromagnet valve 45 as a by-pass line. This check valve 46 has the same design as the other two check valves 23 and 24. The mode of operation is the same as well.

Figure 4:
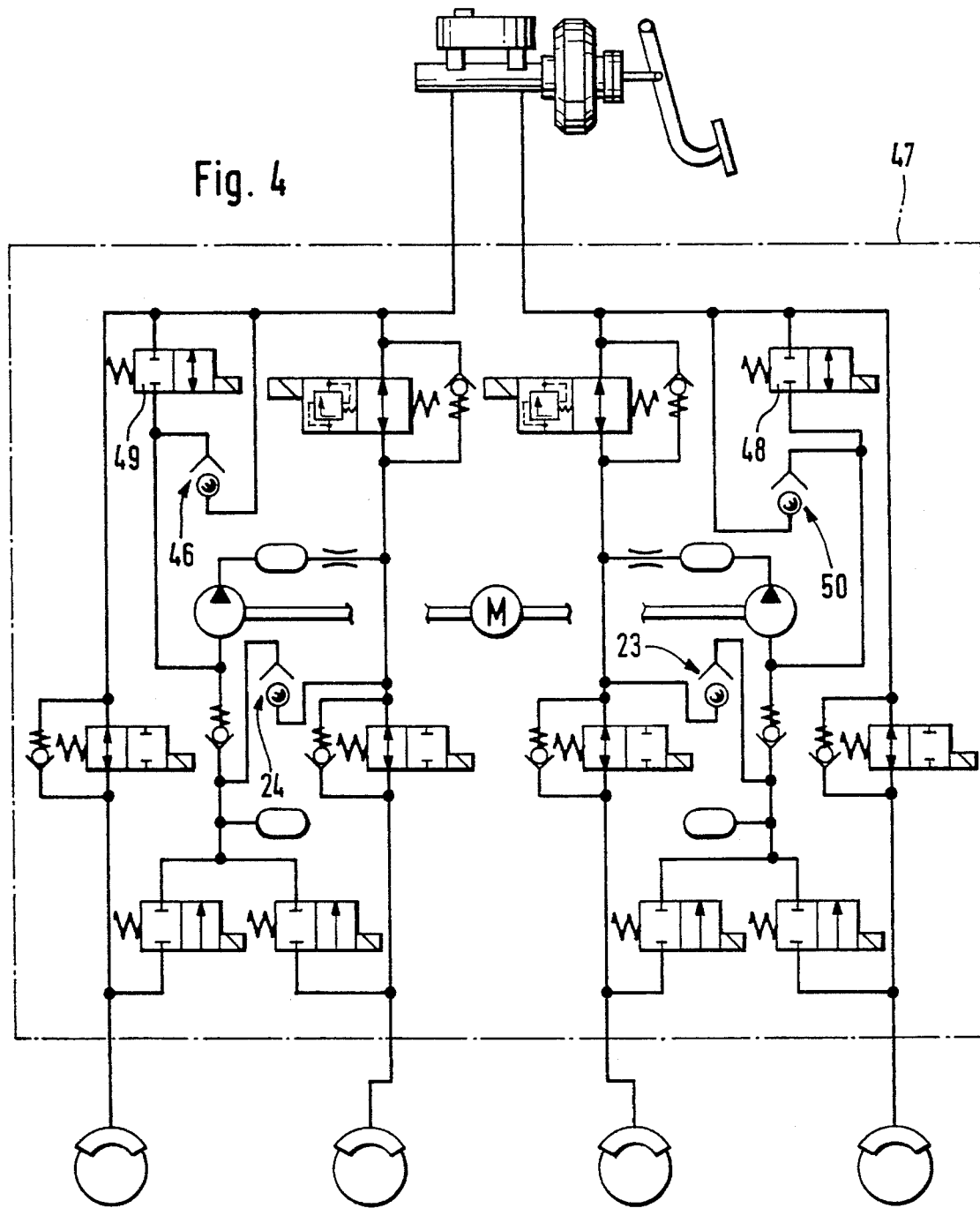
FIG. 4 shows a hydraulic brake system with ABS and traction control devices and diagonal distribution of two brake circuits, with two check valves in each brake circuit.

FIG. 4 shows a system with additional traction control in a K-diagonal distribution of the two brake circuits I and II. In a hydraulic unit 47, each brake circuit I and II is provided with its own ASR electromagnet valve 48 and 49, respectively. Thus each ASR electromagnet valve 48 and 49 requires its own by-pass check valve 46 and 50 with its own connection between the primary and secondary circuits. Otherwise, the conditions are same as in the systems described above.

Figure 5:
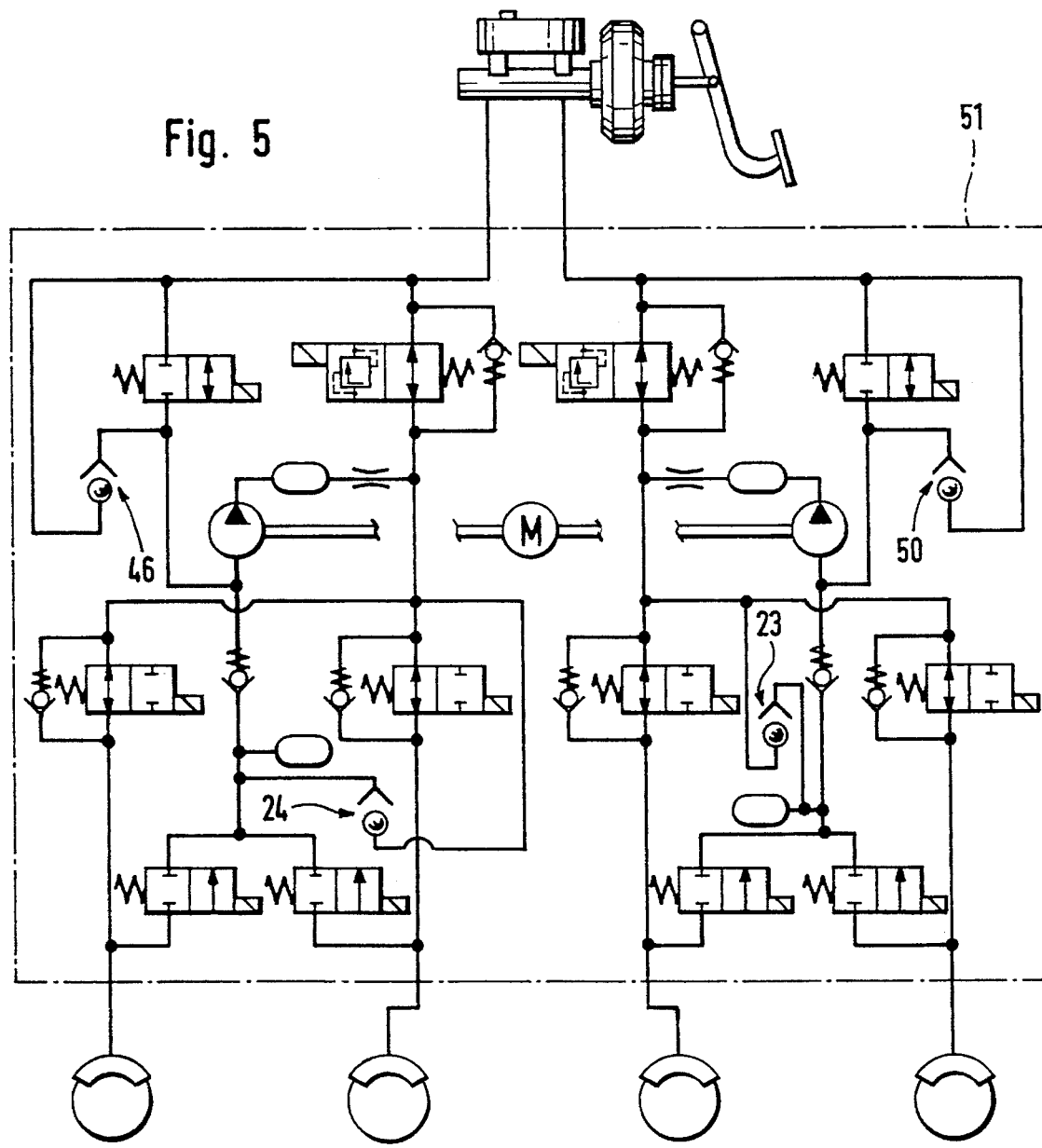
FIG. 5 shows the same brake system as in FIG. 4 but with all-wheel traction control and a different course of the lines.

FIG. 5 shows a system that is equipped with all-wheel traction control and has an X-diagonal distribution of the brake circuits I and II. Once again,.., four by-pass check valves 23, 24, 46 and 50 connected somewhat differently, are provided; they are disposed between the primary and secondary sides of the system and are built into a hydraulic unit 51 so that air bubbles can be eliminated throughout the entire system.

Figure 6:
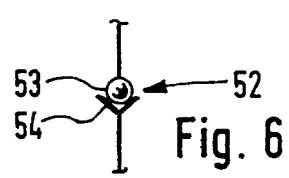
FIG. 6 shows a different model of check valves.

FIG. 6, finally, shows a different model of the check valve built according to the invention, in the filling position. In this check valve 52, the ball-type closing body 53 is disposed above its valve seat 54, so that it is always moved toward its valve seat 54 by gravity.

During evacuation of the system, the ball closing body 53 of such a check valve 52 is lifted. After the evacuation, the ball closing body 53 drops by its own weight onto the valve seat 54, and a vacuum persists in the secondary circuit. The first time the electromagnet valves are actuated in order to open them, which may for instance be done on a rolling test bench or in the course of the test cycle before beginning a trip in the vehicle, the secondary circuit is filled. This model has the advantage that when filling is ended, the valve seat is closed off more reliably than in the exemplary embodiments of FIGS. 1–5.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. A hydraulic brake system for vehicle wheels in a multiple-circuit design including a master brake cylinder with an anti-lock means and/or a traction control means for wheel brakes of the vehicle wheels, each circuit of the system having a primary hydraulic pressure circuit for applying hydraulic pressure to the wheel brakes and a secondary hydraulic pressure circuit for returning the hydraulic pressure from the wheel brakes to the master brake cylinder in which the anti-lock means and/or traction control means for each circuit includes at least one check valve (23, 24; 46, 50; 52), said at least one check valve is interconnected between said primary hydraulic pressure circuit and said secondary hydraulic pressure circuit, in which said at least one check valve is positioned substantially vertically and includes a valve seat and a closing body in which the valve seat is above the closing body and is not closed off by the closing body (25, 26; 53) of the check valve (23, 24; 46, 50; 52) in a position of repose and upon evacuation of the brake system.

2. A hydraulic brake system as defined by claim 1, in which the at least one check valve is positioned with the closing body (25, 26) of the at least one check valve (23, 24; 46, 50) disposed in a normal position below the valve seat (27, 28) and is kept away from the valve seat (27, 28) by gravity in absence of a pressure on said closing body sufficient to close said check valve.

3. A hydraulic brake system as set forth in claim 2, in which a closing body side of said check valve is connected to a pressure line of the primary hydraulic pressure circuit and a valve seat side of said check valve is connected to an inlet side of a pump in a line in said secondary hydraulic pressure circuit.

4. A hydraulic brake system as set forth in claim 1, in which a closing body side of said check valve is connected to a pressure line of the primary hydraulic pressure circuit and a valve seat side of said check valve is connected to an inlet side of a pump in a line in said secondary hydraulic pressure circuit.

5. A hydraulic brake system as defined by claim 1, in which the at least one check valve is positioned with the closing body (25, 26) of the at least one check valve (23, 24; 46, 50) disposed in a normal position above the valve seat (27, 28) and is positioned on the valve seat (27, 28) by gravity in absence of a pressure on said closing body sufficient to open said check valve.

6. A hydraulic brake system as set forth in claim 5 in which a valve seat side of said check valve is connected to a pressure line in said primary hydraulic pressure circuit and a closing body side of said check valve is connected to an inlet side of a pump in a pressure line in said secondary hydraulic pressure circuit.

7. A hydraulic brake system for vehicle wheels in a multiple-circuit design including a master brake cylinder with an anti-lock means and/or a traction control means for wheel brakes of the vehicle wheels, each circuit of the system having a primary hydraulic pressure circuit for applying hydraulic pressure to the wheel brakes and a secondary hydraulic pressure circuit for returning the hydraulic pressure from the wheel brakes to the master brake cylinder in which the anti-lock means and/or traction control means for each circuit includes at least one check valve (23, 24; 46, 50; 52), said at least one check valve is interconnected between said primary hydraulic pressure circuit and said secondary hydraulic pressure circuit, in which said at least one check valve is positioned substantially vertically and includes a valve seat and a closing body in which the valve seat is closed off by the closing body (25, 26; 53) of the check valve (23, 24; 46, 50; 52) in a position of repose and opened upon evacuation of the brake system.

8. A hydraulic brake system as set forth in claim 7 in which a valve seat side of said check valve is connected to a pressure line in said primary hydraulic pressure circuit and a closing body side of said check valve is connected to an inlet side of a pump in a pressure line in said secondary hydraulic pressure circuit.

* * * * *